United States Patent
Manchanda et al.

(10) Patent No.: US 10,129,175 B1
(45) Date of Patent: Nov. 13, 2018

(54) SYSTEMS AND METHODS FOR PERFORMING CARRIER AGGREGATION BASED ON SUBFRAME CONFIGURATION

(71) Applicant: Sprint Spectrum LP, Overland Park, KS (US)

(72) Inventors: Nitesh Manchanda, Overland Park, KS (US); Siddharth Oroskar, Overland Park, KS (US); Jasinder P. Singh, Olathe, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 166 days.

(21) Appl. No.: 14/990,013

(22) Filed: Jan. 7, 2016

(51) Int. Cl.
*H04W 24/08* (2009.01)
*H04L 12/911* (2013.01)
*H04L 5/00* (2006.01)
*H04W 72/04* (2009.01)

(52) U.S. Cl.
CPC .......... *H04L 47/827* (2013.01); *H04L 5/0053* (2013.01); *H04W 72/0446* (2013.01)

(58) Field of Classification Search
CPC . H04L 47/827; H04L 5/0053; H04W 72/0446
See application file for complete search history.

(56) References Cited

U.S. PATENT DOCUMENTS

| | | | |
|---|---|---|---|
| 8,798,014 B2* | 8/2014 | Pan | H04W 72/048 370/321 |
| 9,131,363 B2* | 9/2015 | Vujcic | H04B 7/15507 |
| 2012/0327821 A1* | 12/2012 | Lin | H04W 72/048 370/280 |
| 2015/0124789 A1 | 5/2015 | Jang et al. | |
| 2016/0014734 A1* | 1/2016 | Jang | H04W 24/02 370/329 |
| 2017/0150382 A1* | 5/2017 | Martin | H04W 24/08 |

\* cited by examiner

*Primary Examiner* — Phuc Tran (57) ABSTRACT

Systems and methods are described for performing carrier aggregation based on subframe configuration. It may be determined that conditions for a wireless device in communication with an access node meet a carrier aggregation criteria, wherein the access node and wireless device communicate using a first subframe configuration. Signal information may be received from the wireless device comprising received signal levels for a plurality of candidate secondary carriers. Subframe configurations used by the candidate secondary carriers to communicate with wireless devices may be retrieved. One or more of the plurality of candidate secondary carriers may be selected based on the received signal level information and the retrieved subframe configurations. And carrier aggregation may be activated such that the one or more selected secondary carriers are used to transmit downlink data to the wireless device.

18 Claims, 7 Drawing Sheets

SYSTEMS AND METHODS FOR PERFORMING CARRIER AGGREGATION BASED ON SUBFRAME CONFIGURATION

TECHNICAL BACKGROUND

Telecommunication systems, such as cellular networks or other wireless networks, rely on multiple network elements to provide reliable services. For example, an access point may leverage multiple frequency bands to service wireless devices. In some circumstances, a wireless device may receive signals over multiple frequency bands (e.g., carrier aggregation) to supplement service to the wireless device. Additionally, an access point and wireless devices may rely on predetermined communication protocols (e.g., a subframe configuration) to coordinate uplink and downlink communications. It may be beneficial for a system to consider the subframe configuration used by an access point and/or frequency band when selecting a frequency band to be used for carrier aggregation.

OVERVIEW

Systems and methods are described for performing carrier aggregation based on subframe configuration. It may be determined that conditions for a wireless device in communication with an access node meet a carrier aggregation criteria, wherein the access node and wireless device communicate using a first subframe configuration. Signal information may be received from the wireless device comprising received signal levels for a plurality of candidate secondary carriers. Subframe configurations used by the candidate secondary carriers to communicate with wireless devices may be retrieved. One or more of the plurality of candidate secondary carriers may be selected based on the received signal level information and the retrieved subframe configurations. And carrier aggregation may be activated such that the one or more selected secondary carriers are used to transmit downlink data to the wireless device.

DETAILED DESCRIPTION

Systems and methods are described for performing carrier aggregation based on subframe configuration. Carrier aggregation comprises a wireless device being transmitted data over two or more frequency bands from one or more access nodes. Carry aggregation may include a primary carrier (e.g., primary component carrier) and one or more secondary carriers (e.g., secondary component carriers). When activating or adjusting carrier aggregation, candidate secondary carriers are considered for aggregation. For instance, signal information may be received from a wireless device that comprises received signal levels corresponding to the candidate secondary carriers. Some systems may rely on these received signal levels when selecting a candidate secondary carrier for activation. In an embodiment, in addition to the received signal levels, subframe configurations used to communicate over the candidate secondary carriers may be considered. For example, subframe configurations corresponding to the candidate secondary carriers may be received and may further be analyzed when selecting one or more secondary carriers for the carrier aggregation.

Figure 1:
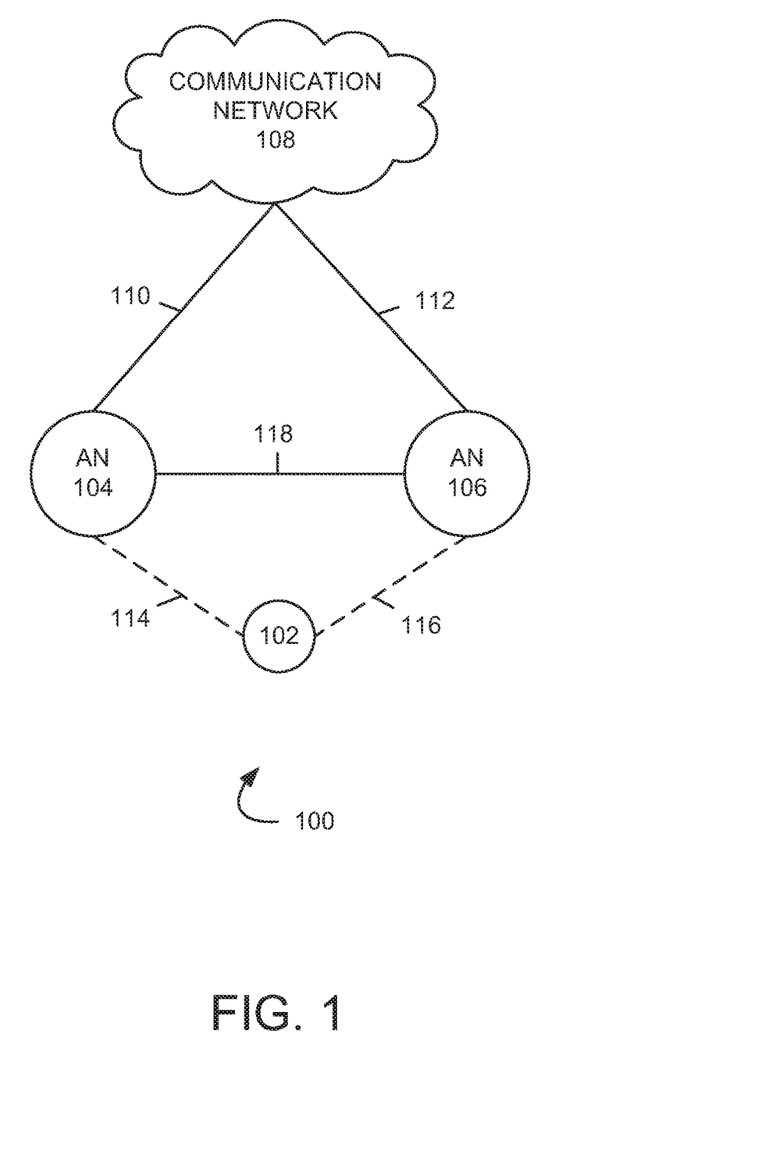
FIG. 1 illustrates an exemplary communication system to perform a carrier aggregation based on subframe configuration.

FIG. 1 illustrates an exemplary communication system 100 to perform a carrier aggregation based on subframe configuration comprising wireless device 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with the depicted access nodes, any number of wireless devices can be implemented.

Access nodes 104 and 106 are network nodes capable of providing wireless communications to wireless device 102, and can be, for example, a base transceiver station, a radio base station, and an eNodeB device. Access nodes 104 and 106 may communicate with communication network 108 over communication links 110 and 112, respectively, and may communicate with each other over communication link 118. Although only two access nodes are illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 104 may establish communication with wireless device 102 such that access node 104 provides the wireless device access to a communication network (e.g., communication network 108). In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, carrier aggregation may also be implemented by the system 100. For example, access node 104 may communicate with wireless device 102 using carrier aggregation such that the data rate (or throughput) for the communication is greater than the data rate for single carrier communication. In an embodiment, access node 104 may communicate with wireless device 102 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 104 and wireless device 102, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In an embodiment, wireless device 102 may access communication network 108 via access node 104, and may also receive signals from access nodes 104 and 106. For example, the received signals may be based on reference signals transmitted from each access node and/or data signals transmitted from each access node. In an embodiment, conditions at wireless device 102 (e.g., quality of service requirements (QCI), device capability, channel quality (CQI), and the like) and/or access node 104 may meet a carrier aggregation criteria. For instance, wireless device 102 may comprise an application requirement that triggers carrier aggregation and access node 104 may experience a load (e.g., number of RRC connections, and the like) that allows for carrier aggregation.

In some embodiments, the plurality of frequency bands used by system 100 may communicate based on a plurality of different subframe configurations. For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. A subframe configuration may comprise uplink subframes and/or downlink subframes, where each subframe configuration may comprise a different mix of subframes. In some embodiments, access nodes 104 and 106 may implement different subframe configurations, and the various cells or frequency bands comprised be each access node may also implement different subframe configurations from one another.

In some instances, an access node leverages signal information from a wireless device to select a secondary carrier for carrier aggregation from among a plurality of candidate secondary carriers. For example, the signal information may comprise received signal levels for signals received at the wireless device over the various candidate secondary carriers. However, such a selection criteria may not adequately consider the communication protocols used by candidate secondary carriers, and thus may fail to result in optimal selection. Accordingly, a system that considers a communication protocol (e.g., subframe configuration) used by the candidate secondary carriers when selecting a carrier for carrier aggregation can provide enhanced service to users of the system.

Figure 2:
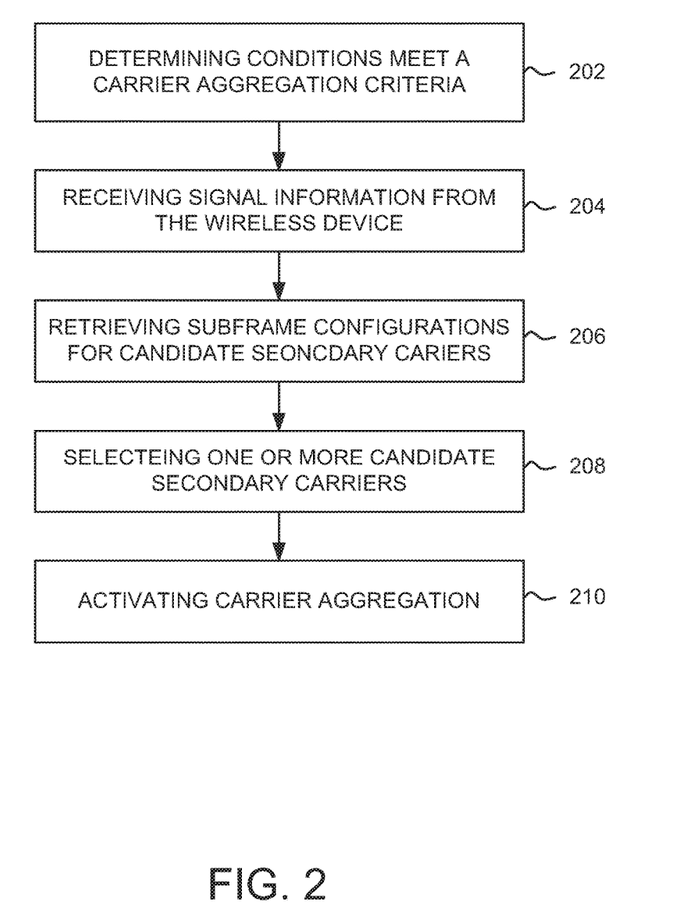
FIG. 2 illustrates an exemplary method for performing a carrier aggregation based on subframe configuration.

FIG. 2 illustrates an exemplary method for performing carrier aggregation based on subframe configuration according to an embodiment. The method will be discussed with reference to the exemplary communication system 100 illustrated in FIG. 1, however, the method can be implemented with any suitable communication system.

Referring to FIG. 2, at step 202, it may be determined that conditions for a wireless device in communication with an access node meet a carrier aggregation criteria, wherein the access node and wireless device communicate using a first subframe configuration. For example, it may be determined that conditions for wireless device 102 meet a carrier aggregation criteria. The conditions may comprise an application requirement for wireless device 102 that triggers a carrier aggregation process. Conditions at access node 104 may also be compared to a carrier aggregation criteria (e.g., a load on access node 104 may be compared to a load criteria) when triggering carrier aggregation.

In an embodiment, access node 104 and wireless device 102 may communicate over a frequency band (e.g., primary carrier) using a first subframe configuration. For example, communication between access node 104 and wireless device 102 may be coordinated according to the first subframe configuration that comprises a mix of uplink and downlink subframes.

At step 204, signal information may be received from the wireless device comprising received signal levels for a plurality of candidate secondary carriers. In an embodiment, signal information may be received at access node 104 from wireless device 102. The signal information may comprise received signal levels corresponding to a plurality of candidate secondary carriers. For example, the signal levels may comprise a RSRP for a signal received from access node 106 and/or access node 104 over the candidate secondary carriers.

At step 206, subframe configurations used by the candidate secondary carriers to communicate with wireless devices may be retrieved. For example, the subframe configurations used to communicate over the candidate secondary carriers may be retrieved, where the candidate secondary carriers may be transmitted from access node 104 and/or 106.

At step 208, one or more of the plurality of candidate secondary carriers may be selected based on the received signal level information and the retrieved subframe configurations. For example, the signal levels corresponding to the plurality of secondary candidate carriers and the subframe configurations for the plurality of candidate secondary carriers may be analyzed such that one or more of the plurality of secondary carriers are selected for carrier aggregation.

At step 210, carrier aggregation may be activated such that the one or more selected secondary carriers are used to transmit downlink data to the wireless device. For example, data signals may be transmitted to wireless device 102 over the primary carrier and the one or more selected secondary carriers based on the activated carrier aggregation. The one or more secondary carriers may be transmitted from access node 104, access node 106, or both of these access nodes.

Figure 3:
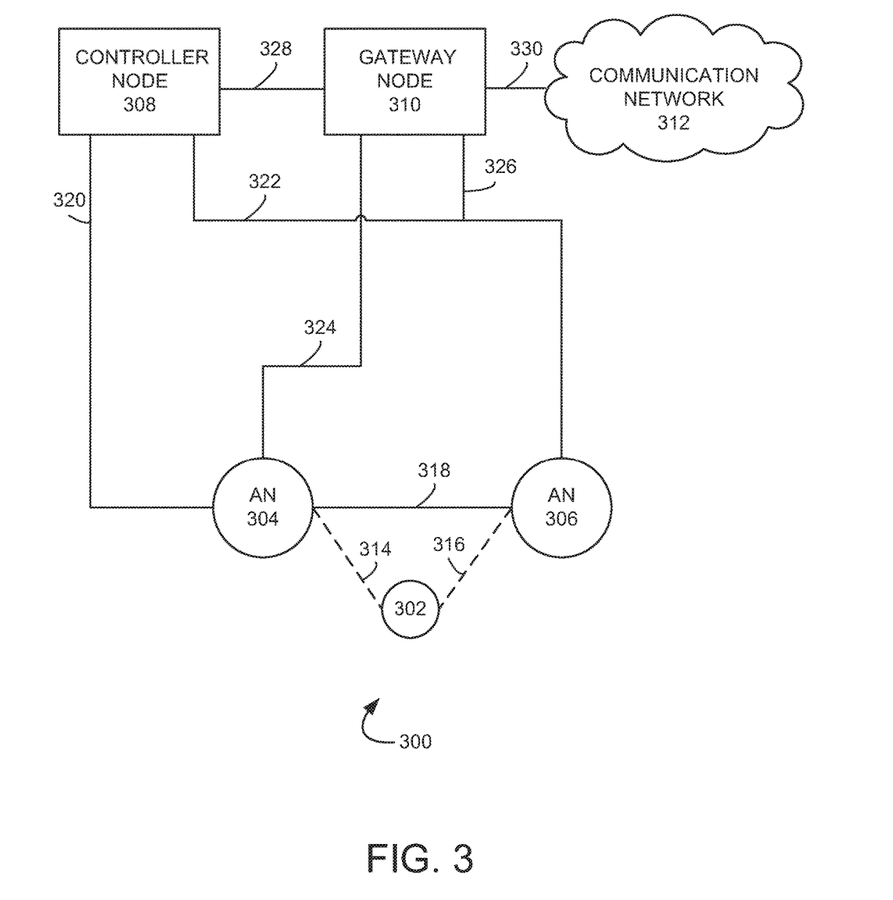
FIG. 3 illustrates another exemplary communication system to perform a carrier aggregation based on subframe configuration.

FIG. 3 illustrates another exemplary communication system 300 to perform carrier aggregation based on subframe configuration. Communication system 300 may comprise wireless device 302, access nodes 304 and 306, controller node 308, gateway node 310, communication network 312, and communication links 314, 316, 318, 320, 322, 324, 326, 328, and 330. Other network elements may be present in the communication system 300 to facilitate communication but are omitted for clarity, such as base stations, base station controllers, gateways, mobile switching centers, dispatch application processors, and location registers such as a home location register or visitor location register.

Wireless device 302 can be any device configured to communicate over communication system 300 using a wireless communication link. For example, wireless device 302 can include a cell phone, a smart phone, a computing platform such as a laptop, palmtop, or a tablet, a personal digital assistant, or an internet access device, and combinations thereof.

Access nodes 304 and 306 are a network node capable of providing wireless communication to wireless device 302, and can be, for example, a base transceiver station, a radio base station, or an eNodeB device. In an embodiment, access node 304 can comprise a serving access node for wireless device 302. Access nodes 304 and 306 may communicate with controller node 308 over communication link 320 and 322, respectively, and with gateway node 310 over communication links 324 and 326, respectively. Access nodes 304 and 306 may communicate with one another over communication link 318.

Controller node 308 can be any network node configured to manage services within system 300. Controller node 308 may provide other control and management functions for system 300. The controller node 308 can be a single device having various functions or a plurality of devices having differing functions. For example, controller node 308 can include at least one of a multi-cell/multicast coordination entity (MCE), a mobility management entity (MME), a radio network controller (RNC), a mobile switching center (MSC), and a combination thereof.

Controller node 308 can comprise a processor and associated circuitry to execute or direct the execution of computer-readable instructions to obtain information. Controller node 308 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 308 can receive instructions and other input at a user interface. Controller node 308 can comprise a processor and associated circuitry to execute or direct the execution of computer-readable instructions to obtain information.

Gateway node 310 is a network element which can comprise a processor and associated circuitry to execute or direct the execution of computer-readable instructions. Gateway node 310 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 310 can provide instructions to access nodes 304 and 306 related to channel selection in communications with wireless device 302. For example, gateway node 310 can comprise at least one of a serving gateway (SGW), a packet data network gateway (PDNGW), a cellular gateway (CGW), and a combination thereof.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 314, 316, 318, 320, 322, 324, 326, 328, and 330 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 304 and 306, controller node 308, gateway node 310, and communication network 312 which are omitted for clarity, including additional processing nodes, routers, gateways, and physical and/or wireless data links for carrying data among the various network elements. In an embodiment, any of controller node 308, gateway node 310, and one or more modules of access nodes 304 and 306, may perform all or parts of the methods of FIGS. 2, 4, and 5.

In operation, access node 304 may establish communication with wireless device 302 such that access node 304 provides the wireless device access to a communication network (e.g., communication network 108). In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, carrier aggregation may also be implemented by system 300. For example, access node 304 may communicate with wireless device 302 using carrier aggregation such that the data rate (or throughput) for the communication is greater than the data rate for single carrier communication. In an embodiment, access node 304 may communicate with wireless device 302 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 304 and wireless device 302, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In an embodiment, wireless device 302 may access communication network 312 via access node 304, and may also receive signals from access nodes 304 and 306. For example, the received signals may be based on reference signals transmitted from each access node and/or data signals transmitted from each access node. In an embodiment, conditions at wireless device 302 (e.g., quality of service requirements (QCI), device capability, channel quality (CQI), and the like) and/or access node 304 may meet a carrier aggregation criteria. For instance, wireless device 302 may comprise an application requirement that triggers carrier aggregation and access node 304 may experience a load (e.g., number of RRC connections, and the like) that allows for carrier aggregation.

In some embodiments, the plurality of frequency bands used by system 300 may communicate based on a plurality of different subframe configurations. For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. A subframe configuration may comprise uplink subframes and/or downlink subframes, where each subframe configuration may comprise a different mix of subframes. In some embodiments, access nodes 304 and 306 may implement different subframe configurations, and the various cells or frequency bands comprised be each access node may implement different subframe configurations from one another.

In some instances, an access node leverages signal information from a wireless device to select a secondary carrier for carrier aggregation from among a plurality of candidate secondary carriers. For example, the signal information may comprise received signal levels for signals received at the wireless device over the various candidate secondary carriers. However, such a selection criteria may not adequately consider the communication protocols used by candidate secondary carriers, and thus may fail to result in optimal selection. Accordingly, a system that considers a communication protocol (e.g., subframe configuration) used by the candidate secondary carriers when selecting a carrier for carrier aggregation can provide enhanced service to users of the system.

Figure 4:
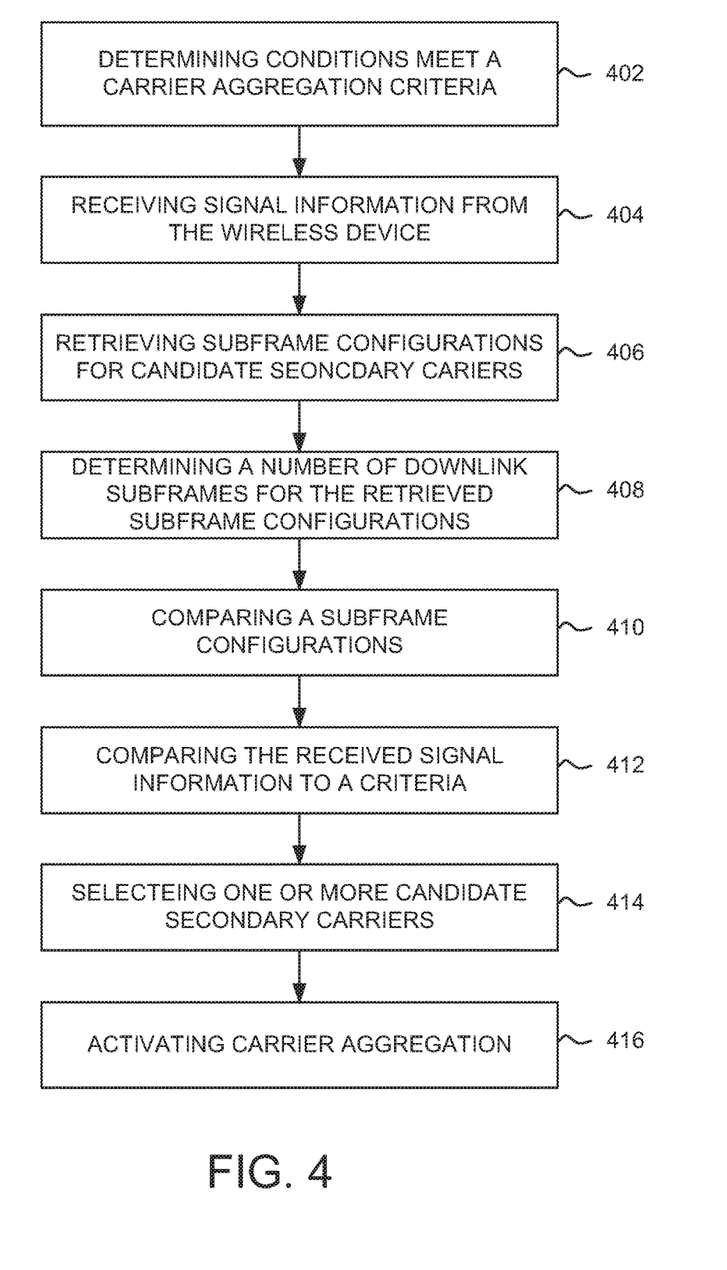
FIG. 4 illustrates another exemplary method for performing a carrier aggregation based on subframe configuration.

FIG. 4 illustrates an exemplary method for performing a handover based on target configuration according to an embodiment. The method will be discussed with reference to the exemplary communication system 300 illustrated in FIG. 3, however, the method can be implemented with any suitable communication system.

Referring to FIG. 4, at step 402, it may be determined that conditions for a wireless device in communication with an access node meet a carrier aggregation criteria, wherein the access node and wireless device communicate using a first subframe configuration. For example, it may be determined that conditions for wireless device 302 meet a carrier aggregation criteria. The conditions may comprise one or more of an application requirement for wireless device 302, a bearer type for wireless device 302 (e.g., some bearer types may not be compatible with carrier aggregation), a transmission buffer from access node 304 for data to be transmitted to wireless device 302, and channel conditions (e.g., a reported CQI) for wireless device 302, and these conditions may trigger a carrier aggregation process.

In an embodiment, conditions at access node 304 may also be compared to a carrier aggregation criteria (e.g., a load metric, such as number of RRC connections, processing load, and the like, on access node 304 may be compared to a load criteria) when triggering carrier aggregation. In an embodiment, the carrier aggregation criteria may comprise criteria for one or more of the conditions for access node 304 and/or wireless device 302 (e.g., load criteria, signal level criteria, application requirements criteria, buffer criteria, and the like). The conditions for wireless device 302 and access node 304 that are compared to the carrier aggregation metric may be monitored such that the monitored conditions may trigger the carrier aggregation process. Any suitable conditions and/or carrier aggregation criteria may be implemented in various embodiments.

In an embodiment, access node 304 and wireless device 302 may communicate over a frequency band (e.g., primary carrier) using a first subframe configuration. For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. In an embodiment, a frame structure may comprise uplink subframes and/or downlink subframes, where each frame structure may comprise a different mix of subframes.

Figure 6:
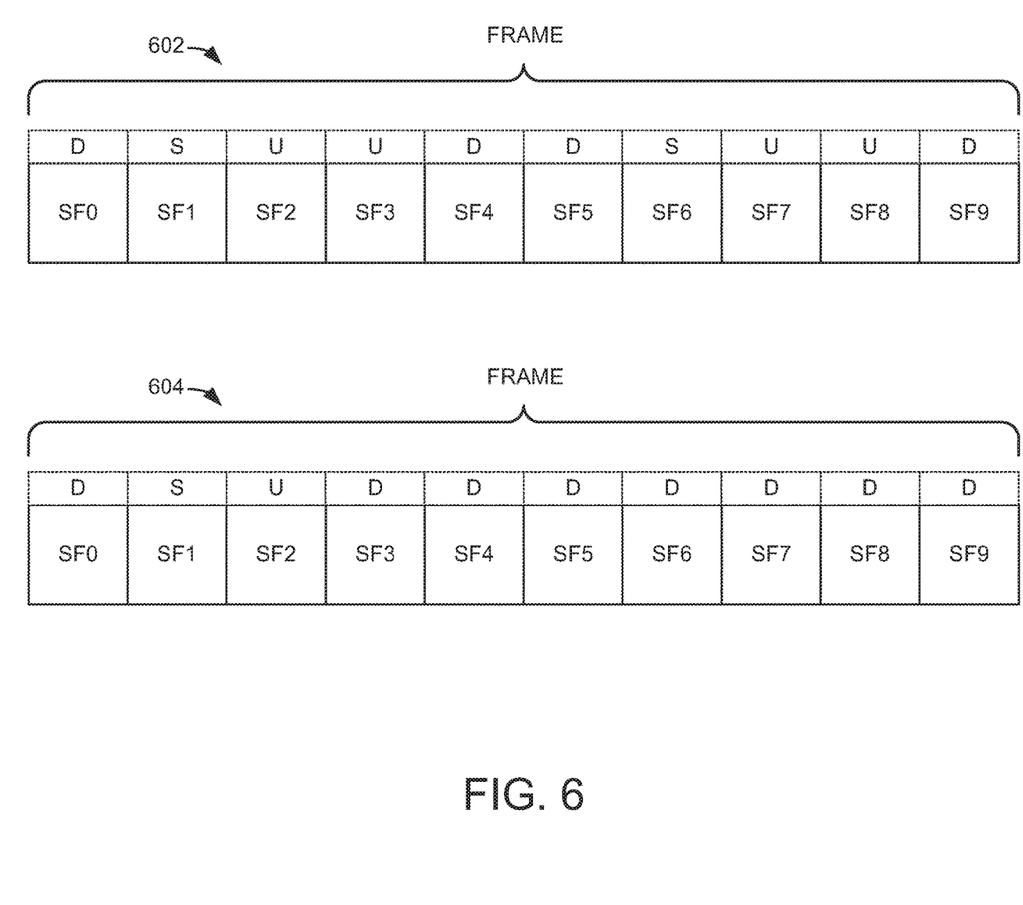
FIG. 6 illustrates subframe configurations used for wireless communication.

FIG. 6 illustrates sample subframes structures in accordance with an embodiment. For example, a frame structure 602 may comprise 10 subframes, where the order of subframes may comprise downlink, special, uplink, uplink, downlink, downlink, special, uplink, uplink, and downlink. A frame structure 604 may comprise 10 subframes, where the order of subframes may comprise downlink, special, uplink, downlink, downlink, downlink, downlink, downlink, downlink, and downlink. Other frame structure may comprise various other mixes of special, downlink, and uplink configurations. In an embodiment, access node 304 may communicate with wireless device 302 based on a first subframe configuration.

At step 404, signal information may be received from the wireless device comprising received signal levels for a plurality of candidate secondary carriers. For example, signal information may be received at access node 304 from wireless device 302. The signal information may comprise received signal levels corresponding to a plurality of candidate secondary carriers.

In an embodiment, the signal information may be received at access node 304 from wireless device 302 in response to a reporting event being triggered. The reporting event may comprise an LTE reporting event that is triggered based on the conditions at wireless device 302 and/or access node 304 meeting a carrier aggregation criteria, any other suitable triggering event, or a period (e.g., predetermined timer) for reporting. Based on a triggering event, a wireless device may transmit reports comprising signal information to a serving access node.

In an embodiment, the signal information may comprise received signal levels for signals received at wireless device 302 from access node 304 and/or access node 306 over a plurality of candidate secondary carriers (e.g., frequency bands). Some example signal levels may comprise a Received Signal Strength Indicator, (RSSI), Reference Signal Received Quality (RSRQ), RSRP, or any other suitable signal level.

At step 406, subframe configurations used by the candidate secondary carriers to communicate with wireless devices may be retrieved. For example, the subframe configurations used to communicate over the candidate secondary carriers may be retrieved, where the candidate secondary carriers may be transmitted from access node 304 and/or 306. In this example, the mix of uplink, downlink, and/or special subframes for the subframe configurations used over candidate secondary carriers may be retrieved.

In an embodiment where one of access node 306 transmits a candidate secondary carrier received at wireless device 302, access node 304 may retrieve a subframe configuration for the candidate secondary carrier from access node 306. For example, over an X2 connection, a plurality of access nodes may share configuration information, such as subframe configurations for various frequency bands used for communication. In an embodiment, the subframe configuration may also be shared over an S1 connection, where a routing node may be leveraged to route traffic to and from the access nodes.

At step 408, a number of downlink subframes for the retrieved subframe configurations may be determined. For example, subframe configurations for the plurality of secondary carriers may be retrieved. The number of downlink subframes for a frame (e.g., set of 10 subframes) for each retrieved subframe configuration may be determined (e.g., 4 out of 10 subframes, 5 out of 10 subframes, 6 out of 10 subframes, and the like). For example, it may be determined that subframe configuration 602 of FIG. 6 has 4 downlink subframes while subframe configuration 604 has 8 downlink subframes.

At step 410, the retrieved subframes configurations may be compared. For example, subframe configurations retrieved for the plurality of candidate secondary carriers may be compared.

In an embodiment, downlink subframe slots for the plurality of retrieved subframe configurations may be compared with uplink subframe slots for the first subframe configuration (e.g., used by the primary carrier), wherein the comparing identifies retrieved subframe configurations that have a slotted downlink subframe that conflicts with a slotted uplink subframe for the first subframe configuration. For example, in some instances, an identified conflict may include identifying a slot in a subframe structure where downlink signals are slotted to be transmitted by an access node to wireless device 302 (e.g., a downlink subframe is scheduled) at the same time that wireless device 302 is scheduled to transmit an uplink subframe over the primary carrier (e.g., an uplink subframe). In an embodiment, this conflict may cause the downlink subframe with the identified conflict to be unusable for carrier aggregation, as a wireless device, in some instances, may not be able to receive a transmission over a secondary carrier while simultaneously transmitting a transmission over the primary carrier.

In an embodiment, comparing the retrieved subframe configurations may comprise determining a signal level criteria for each of the candidate secondary carriers based on the retrieved subframe configuration for the candidate secondary carrier. For example, carrier aggregation techniques may involve selecting a secondary carrier based on a comparison between a received signal level corresponding to the secondary carrier and a signal level criteria (e.g., signal level threshold). In an embodiment, the signal level criteria being compared to each candidate secondary carrier may be calculated for each carrier based on the retrieved subframe configurations.

In some examples, the signal level criteria for a particular candidate secondary carrier may be calculated based on the number of downlink subframes for the retrieved subframe configuration corresponding to the particular candidate secondary carrier. Here, the signal level criteria (e.g., signal level threshold) for a particular candidate secondary carrier may be inversely proportional to the number of downlink subframes for the retrieved subframe configuration corresponding to the particular candidate secondary carrier. In other words, a signal level criteria (e.g., threshold) may be reduced from a default signal level criteria such that it is easier to meet when a subframe configuration has a large number of determined downlink subframes (e.g., greater than a default value) and may be increased such that it is harder to meet when a subframe configuration has a small number of determined downlink subframes (e.g., smaller than a default value). Such a configuration may bias the carrier aggregation process to select a candidate secondary carrier that corresponds to a retrieved subframe configuration with a large number of downlink subframes.

At step 412, the received signal information may be compared to a criteria. For example, the received signal levels corresponding to the candidate secondary carriers from wireless device 302 may be compared to a signal level criteria (e.g., signal level threshold).

In some embodiments, the signal level criteria may be consistent for the plurality of candidate secondary carriers. For example, the signal level criteria may represent a minimum signal level required for selection as a secondary carrier. Here, candidate secondary carriers with a received signal level that does not meet the signal level criteria may not be selected for carrier aggregation.

In other embodiments, a signal level criteria may be calculated for each candidate secondary carrier based on a subframe configuration that corresponds to the candidate secondary carrier, as discussed herein. For example, a signal level criteria calculated for a particular candidate secondary carrier may be compared to the received signal level for the particular candidate secondary carrier. In this example, the selection of a candidate secondary carrier may be biased towards candidate secondary carriers that communicate using a subframe configuration with a large number of downlink subframes.

At step 414, one or more candidate secondary carriers may be selected for carrier aggregation. For example, one or more candidate secondary carriers transmitted by access node 304 and/or access node 306 may be selected for carrier aggregation such that the selected candidate secondary carrier is used to transmit data to wireless device 302.

In an embodiment, a number of downlink subframes for each of the retrieved subframe configurations may be determined and the one or more of the plurality of candidate secondary carriers may be selected based on the received signal level information and the number of downlink subframes for the retrieved subframe configurations. For example, received signal levels corresponding to each candidate secondary carrier may be compared to a signal level criteria (e.g., threshold), and those that do not meet the signal level criteria may be disqualified from selection. Of those that do meet the signal level criteria, a candidate secondary carrier that corresponds to a retrieved subframe configuration with the greatest number of downlink subframes may be selected. In other embodiments, multiple candidate secondary carriers that correspond to retrieved subframe configurations with the greatest numbers of downlink subframes may be selected.

In an embodiment, subframe configurations may be compared to identify conflicts and the one or more of the plurality of candidate secondary carriers may be selected based on the received signal level information, the number of downlink subframes for the retrieved subframe configurations, and the identified conflicts. For example, received signal levels corresponding to each candidate secondary carrier may be compared to a signal level criteria (e.g., threshold), and those that do not meet the signal level criteria may be disqualified from selection. Of those that do meet the signal level criteria, a candidate secondary carrier that corresponds to a retrieved subframe configuration with the greatest number of downlink subframes may be selected. In some embodiments, the number of downlink subframes for a candidate secondary carrier may be discounted by identified conflicts (e.g., conflicts with uplink subframes over the primary carrier) when selecting the one or more candidate secondary carriers. Accordingly, the number of identified conflicts may be subtracted form the number of downlink subframes for a subframe configuration when performing the selecting.

In an embodiment, the one or more of the plurality of candidate secondary carriers may be selected based on a comparison between the received signal levels and determined signal level criteria corresponding to the candidate secondary carriers and the number of downlink subframes for the retrieved subframe configurations. For example, a signal level criteria calculated for a particular candidate secondary carrier may be compared to the received signal level for the particular candidate secondary carrier. In this example, the selection of a candidate secondary carrier may be biased towards candidate secondary carriers that communicate using a subframe configuration with a large number of downlink subframes, as discussed herein. Where more than one received signal level for a candidate secondary carriers meets the signal level criteria calculated for the particular candidate secondary carrier, a selection may be based on a greatest number of downlink subframes for the retrieved subframe configuration corresponding to a candidate secondary carrier, a greatest received signal level corresponding to a candidate secondary carrier (or greatest difference between the received signal level and the calculated signal level criteria for the candidate secondary carrier), or a combination of these.

At step 414, carrier aggregation may be activated such that the one or more selected secondary carriers are used to transmit downlink data to the wireless device. For example, data signals may be transmitted to wireless device 302 over the primary carrier and the one or more selected secondary carriers based on the activated carrier aggregation. The one or more secondary carriers may be transmitted from access node 304, access node 306, or both of these access nodes.

In an embodiment, the carrier aggregation may be adjusted based on the selection of the one or more candidate secondary carriers. For example, wireless device 302 may already receive downlink data over a primary carrier and a secondary carrier, and the carrier aggregation may be adjusted such that the selected one or more candidate secondary carriers are added to the carrier aggregation. As such, carrier aggregation may be activated on the selected secondary carrier.

Figure 5:
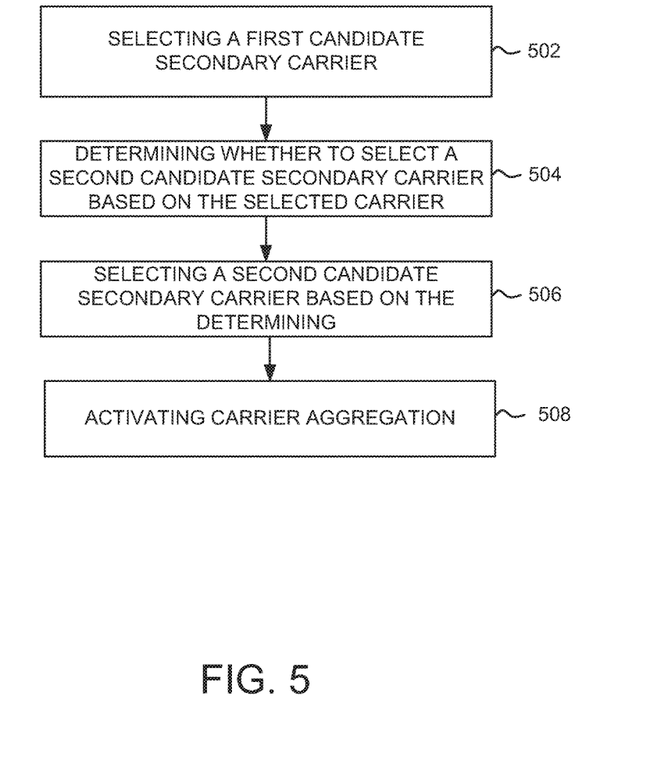
FIG. 5 illustrates another exemplary method for selecting a candidate secondary carrier.

FIG. 5 illustrates an exemplary method for selecting a candidate secondary carrier for carrier aggregation according to an embodiment. The method will be discussed with reference to the exemplary communication system 300 illustrated in FIG. 3, however, the method can be implemented with any suitable communication system.

At step 502 a first candidate secondary carrier may be selected for carrier aggregation. For example, a first candidate secondary carrier transmitted by access node 304 and/or access node 306 may be selected for carrier aggregation such that the selected candidate secondary carrier is used to transmit data to wireless device 302. The first candidate secondary carrier may be selected as described in selection step 414 of FIG. 4

At step 504, it may be determined whether to select a second candidate secondary carrier based on the selected first candidate secondary carrier. For example, it may be determined whether to select a second candidate secondary carrier based on the number of downlink subframes for the subframe configuration corresponding to the selected first candidate secondary carrier (or based on the number of downlink subframes less a number of identified conflicts, as discussed with reference to FIG. 4). In an embodiment, the number of downlink subframes for the subframe configuration corresponding to the selected first candidate secondary carrier may be compared to a criteria (e.g., threshold), and it may be determined that a second candidate secondary carrier will be selected when the number of downlink subframes fails to meet the criteria.

In an embodiment, the criteria may be based on an application requirement for wireless device 302. For example, an application requirement, such as a quality of service class identifier (QCI), minimum data rate, and the like, for wireless device 302 may trigger the carrier aggregation process. In another example, an application requirement and transmission buffer (e.g., at access node 304), for wireless device 302 may trigger the carrier aggregation process. In an embodiment, the criteria used to determine whether to select a second candidate carrier for carrier aggregation may be based on the application requirement, the transmission buffer, and any other suitable conditions for wireless device 302 (e.g., conditions considered when triggering carrier aggregation, as described herein).

At step 506, a second candidate secondary carrier may be selected based on the determining. For example, it may be determined that a second candidate secondary carrier will be selected when the number of downlink subframes for the subframe configuration corresponding to the selected first candidate secondary carrier fails to meet a criteria.

In an embodiment, the second candidate secondary carrier may be selected similarly to the selected first candidate secondary carrier. For example, the second candidate secondary carrier may be selected based on one or more of a number of downlink subframes for the subframe structure corresponding to the second candidate secondary carrier, received signal information (e.g., a received signal level at wireless device 302 over the second candidate secondary carrier), identified conflicts for the second candidate secondary carrier, comparisons between the signal information and a signal level criteria (e.g., a consistent signal level criteria or a signal level criteria determined particularly for the second candidate secondary carriers), and any other suitable factors. In an embodiment, the second candidate secondary carrier may be selected similarly to the selection technique described in step 414 of FIG. 4.

At step 508, carrier aggregation may be activated such that the second selected secondary carrier is used to transmit downlink data to the wireless device. For example, data signals may be transmitted to wireless device 302 over the primary carrier, the first selected secondary carrier, and the second selected secondary carrier based on the activated carrier aggregation. The secondary carriers may be transmitted from access node 304, access node 306, or both of these access nodes.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
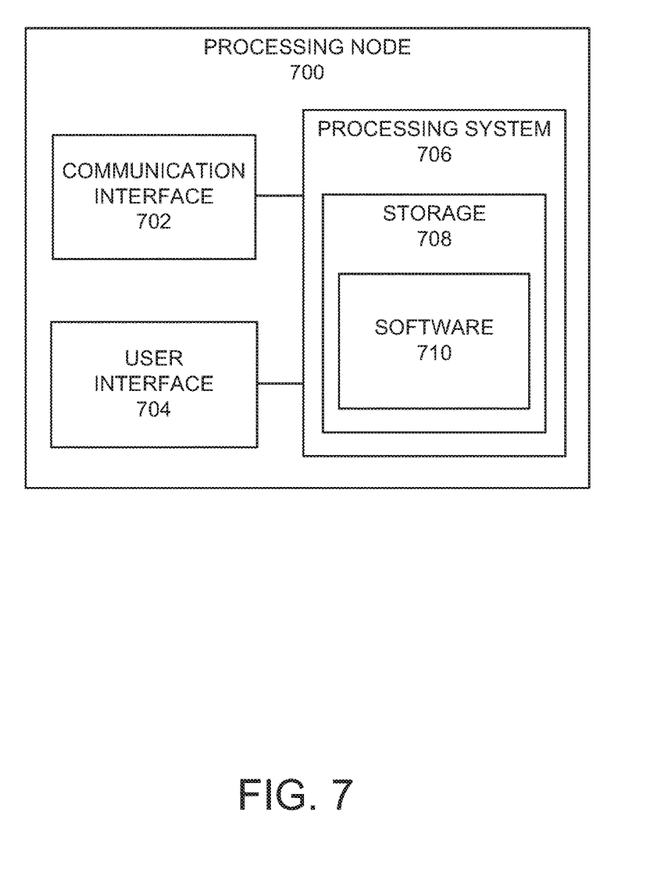
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 308 and gateway node 310. Processing node 700 can also be an adjunct or component of a network element, such as an element of access nodes 104, 106, 304, or 306 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for performing carrier aggregation based on subframe configuration, the method comprising:
   determining that conditions for a wireless device in communication with an access node meet a carrier aggregation criteria, wherein the access node and wireless device communicate using a first subframe configuration;
   receiving signal information from the wireless device comprising received signal levels for a plurality of candidate secondary carriers;
   retrieving subframe configurations used by the candidate secondary carriers to communicate with wireless devices;
   selecting one or more of the plurality of candidate secondary carriers based on the received signal level information and the retrieved subframe configurations; and
   activating carrier aggregation such that the one or more selected secondary carriers are used to transmit downlink data to the wireless device.

2. The method of claim 1, wherein selecting one or more of the plurality of candidate secondary carriers further comprises:
   determining a number of downlink subframes for each of the retrieved subframe configurations; and
   selecting one or more of the plurality of candidate secondary carriers based on the received signal level information and the number of downlink subframes for the retrieved subframe configurations.

3. The method of claim 2, wherein selecting one or more of the plurality of candidate secondary carriers further comprises:
   comparing the received signal levels for the plurality of candidate secondary carriers to a criteria; and
   selecting one or more of the plurality of candidate secondary carriers based on the comparison between the received signal levels and the criteria and the number of downlink subframes for the retrieved subframe configurations.

4. The method of claim 2, wherein selecting one or more of the plurality of candidate secondary carriers further comprises:
   determining a signal level criteria for each of the candidate secondary carriers based on the retrieved subframe configuration for the candidate secondary carrier;
   comparing the received signal levels for the plurality of candidate secondary carriers to the determined criteria for each candidate secondary carrier; and
   selecting one or more of the plurality of candidate secondary carriers based on the comparison between the received signal levels and the criteria and the number of downlink subframes for the retrieved subframe configurations.

5. The method of claim 4, wherein the signal level criteria for a particular candidate secondary carrier is determined based on a number of downlink subframes for the retrieved subframe configuration corresponding to the particular candidate secondary carrier.

6. The method of claim 2, wherein selecting one or more of the plurality of candidate secondary carriers further comprises:
   comparing downlink subframe slots for the retrieved subframe configurations with uplink subframe slots for the first subframe configuration, wherein the comparing identifies retrieved subframe configurations that have a slotted downlink subframe that conflicts with a slotted uplink subframe for the first subframe configuration; and
   selecting one or more of the plurality of candidate secondary carriers based on the received signal level information, the number of downlink subframes for the retrieved subframe configurations, and the identified conflicts.

7. The method of claim 2, wherein selecting one or more of the plurality of candidate secondary carriers further comprises:
   selecting a first of the plurality of candidate secondary carriers based on the received signal level information and the retrieved subframe configurations;
   determining whether to select a second candidate secondary carrier based on a number of downlink subframes for the subframe configuration corresponding to the first candidate secondary carrier; and
   selecting a second candidate secondary carrier based on the received signal level information and the retrieved subframe configurations when it is determined that a second candidate secondary carrier should be selected.

8. The method of claim 7, further comprising determining to select a second candidate secondary carrier when the number of downlink subframes for the subframe configuration corresponding to the selected first candidate secondary carrier fails to meet a criteria.

9. A method of claim 1, wherein at least one of the candidate secondary carriers is transmitted from a second access node and retrieving the subframe configuration for the at least one of the candidate secondary carriers comprises receiving the subframe configuration over an X2 communication link connecting the access node and the second access node.

10. A system for performing carrier aggregation based on subframe configuration, the system comprising:
    an processing node with a processor configured to:
    determine that conditions for a wireless device in communication with an access node meet a carrier aggregation criteria, wherein the access node and wireless device communicate using a first subframe configuration;
    receive signal information from the wireless device comprising received signal levels for a plurality of candidate secondary carriers;
    retrieve subframe configurations used by the candidate secondary carriers to communicate with wireless devices;
    select one or more of the plurality of candidate secondary carriers based on the received signal level information and the retrieved subframe configurations; and
    activate carrier aggregation such that the one or more selected secondary carriers are used to transmit downlink data to the wireless device.

11. The system of claim 10, wherein selecting one or more of the plurality of candidate secondary carriers further comprises:
    determining a number of downlink subframes for each of the retrieved subframe configurations; and
    selecting one or more of the plurality of candidate secondary carriers based on the received signal level information and the number of downlink subframes for the retrieved subframe configurations.

12. The system of claim 11, wherein selecting one or more of the plurality of candidate secondary carriers further comprises:
- comparing the received signal levels for the plurality of candidate secondary carriers to a criteria; and
- selecting one or more of the plurality of candidate secondary carriers based on the comparison between the received signal levels and the criteria and the number of downlink subframes for the retrieved subframe configurations.

13. The system of claim 11, wherein selecting one or more of the plurality of candidate secondary carriers further comprises:
- determining a signal level criteria for each of the candidate secondary carriers based on the retrieved subframe configuration for the candidate secondary carrier;
- comparing the received signal levels for the plurality of candidate secondary carriers to the determined criteria for each candidate secondary carrier; and
- selecting one or more of the plurality of candidate secondary carriers based on the comparison between the received signal levels and the criteria and the number of downlink subframes for the retrieved subframe configurations.

14. The system of claim 13, wherein the signal level criteria for a particular candidate secondary carrier is determined based on a number of downlink subframes for the retrieved subframe configuration corresponding to the particular candidate secondary carrier.

15. The system of claim 11, wherein selecting one or more of the plurality of candidate secondary carriers further comprises:
- comparing downlink subframe slots for the retrieved subframe configurations with uplink subframe slots for the first subframe configuration, wherein the comparing identifies retrieved subframe configurations that have a slotted downlink subframe that conflicts with a slotted uplink subframe for the first subframe configuration; and
- selecting one or more of the plurality of candidate secondary carriers based on the received signal level information, the number of downlink subframes for the retrieved subframe configurations, and the identified conflicts.

16. The system of claim 11, wherein selecting one or more of the plurality of candidate secondary carriers further comprises:
- selecting a first of the plurality of candidate secondary carriers based on the received signal level information and the retrieved subframe configurations;
- determining whether to select a second candidate secondary carrier based on a number of downlink subframes for the subframe configuration corresponding to the first candidate secondary carrier; and
- selecting a second candidate secondary carrier based on the received signal level information and the retrieved subframe configurations when it is determined that a second candidate secondary carrier should be selected.

17. The system of claim 16, where the processing node is further configured to determine to select a second candidate secondary carrier when the number of downlink subframes for the subframe configuration corresponding to the selected first candidate secondary carrier fails to meet a criteria.

18. A system of claim 10, wherein at least one of the candidate secondary carriers is transmitted from a second access node and retrieving the subframe configuration for the at least one of the candidate secondary carriers comprises receiving the subframe configuration over an X2 communication link connecting the access node and the second access node.

* * * * *